May 15, 1951     A. REITBERGER     2,553,521
DRIVE MECHANISM
Filed Sept. 30, 1947
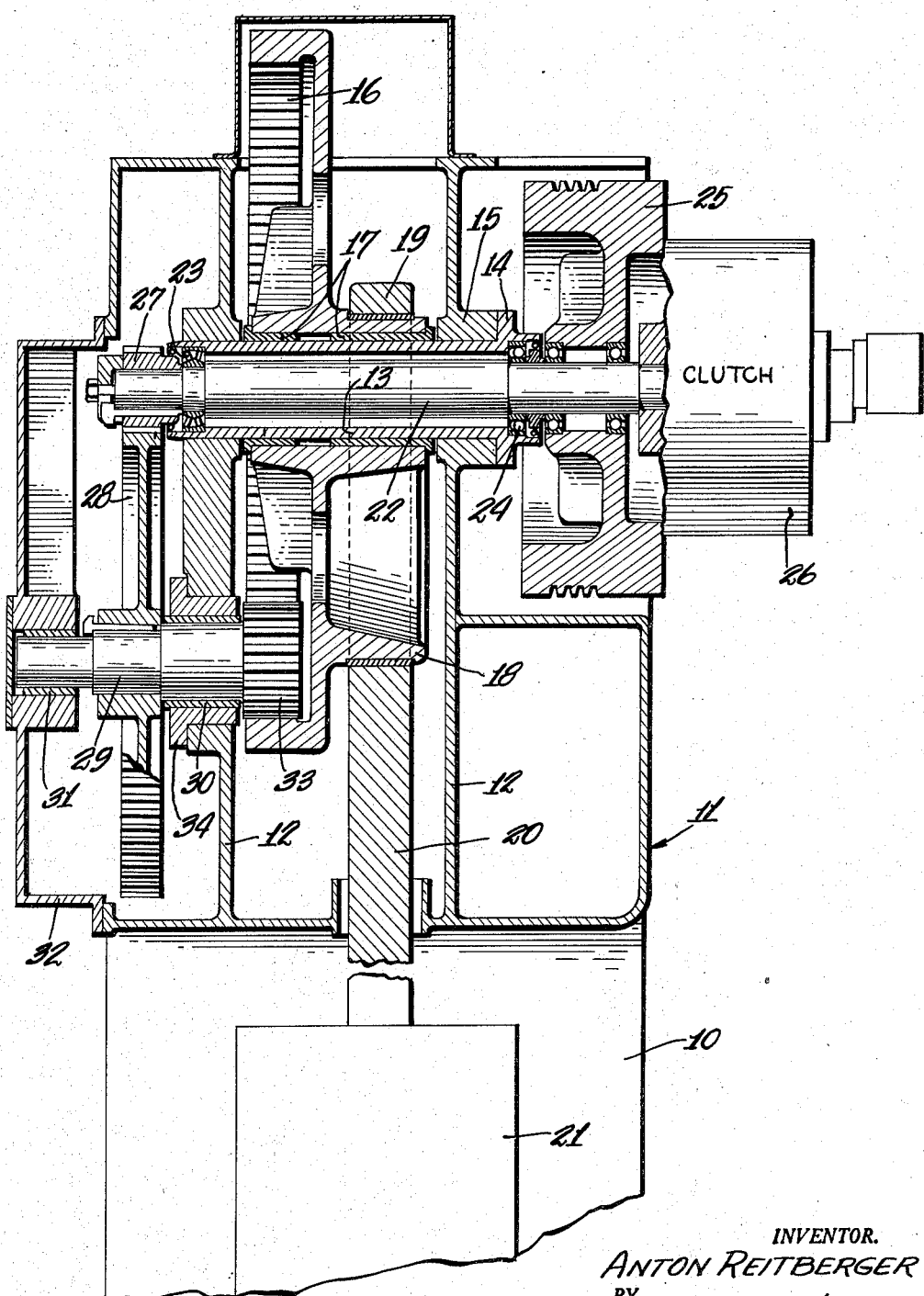
INVENTOR.
ANTON REITBERGER
BY
ATTORNEY Patented May 15, 1951

2,553,521

UNITED STATES PATENT OFFICE 2,553,521

DRIVE MECHANISM

Anton Reitberger, Warren, Ohio, assignor to Warren City Manufacturing Company, Warren, Ohio, a corporation of Ohio Application September 30, 1947, Serial No. 776,955

3 Claims. (Cl. 74—44)

My invention relates to drive mechanism for power presses, and the principal object of my invention is to provide new and improved drive mechanisms of this character.

Drive mechanisms for power presses are usually of the gear type, and in order to secure a suitable reduction in the gearing, a plurality of intermeshing gears are provided. Inasmuch as the press mechanism is subject to considerable mechanical stress during its operation, the gears, shafts, etc., are of necessity considerable in size. Thus, with a proper train of gears, the great amount of space occupied by the drive mechanism presented difficult engineering problems.

My invention provides a drive mechanism which in all respects will function equally as well as the conventional drive now in use, yet which occupies only a fraction of the space heretofore required. Other and further advantages will be obvious as the description proceeds.

In the drawing accompanying this specification and forming a part of this application, there is shown, for purposes of illustration, an embodiment which my invention may assume, and in this drawing, the single figure is a fragmentary sectional view through the drive mechanism of a power press, certain parts being shown in elevation for purposes of clarity.

The usual power press comprises a base, side frames, and a crown or top portion, but since my invention relates only to the drive mechanism, the base has been omitted from the drawing and only one side frame 10 is shown.

The crown 11 of the press may be formed in any desired manner, such as by fabrication or casting methods, and is formed with partitions 12. In the embodiment herein disclosed, a sleeve 13 traverses the partitions 12 near the upper end of the crown, the sleeve being securely fixed to the partitions in any suitable manner, such as by welding or the like. The sleeve 13 may be formed with a shoulder 14 which abuts a boss 15 on one of the partitions, to predetermine assembly of the sleeve with the partitions.

The sleeve 13 provides a support for a gear, and a drive shaft extends at least partially through the sleeve, the drive shaft carrying a gear which meshes with other gears to drive the gear carried by the sleeve.

The construction specifically disclosed is particularly adapted for use with an eccentric actuated press, and for this purpose gear 16 is journalled on sleeve bearings 17 carried by the sleeve 13. The gear 16 is here shown as of the internal kind, although from a functional standpoint, an external gear will operate equally as well.

The gear 16 is provided with an eccentric hub 18 which receives the strap 19 of the pitman 20, and the latter is connected to the die holder 21 of the press in any conventional manner. From the foregoing, it will be clear that rotation of the gear 16 will cause reciprocation of the pitman 20 and the connected die holder 21.

A drive shaft 22 extends through the sleeve 13, and has its ends extending outwardly of the sleeve, the portion of the drive shaft within the sleeve preferably being of lesser diameter than the interior diameter of the sleeve, so that bearings 23 and 24 at the ends of the sleeve may provide for rotation of the shaft 22 relative to the sleeve 13.

A drive pulley 25, connected to a suitable driving motor (not shown) is freely journalled on one end of the drive shaft 22, and a clutch 26 of any suitable type may be provided for selectively connecting the drive pulley 25 and drive shaft 22 for rotation in unison. Since the clutch forms no part of this invention, and may be of any suitable commercially available type, its specific construction is not shown.

A drive pinion 27 is keyed to the other end of the drive shaft, and meshes with an intermediate gear 28 which is keyed to an intermediate shaft 29. In the embodiment herein shown, the intermediate shaft 29 is journalled in bearings 30, 31 respectively carried in one of the partitions 12 and a cover 32 detachably secured to the crown 11. Also carried by the intermediate shaft 29 is an intermediate pinion 33 which meshes with the gear 16.

A holder 34 for the bearing 30 fits within an aperture in the partition 12, this aperture being of such size that the entire intermediate shaft assembly is available for removal from the crown when the cover 32 is detached from the crown.

It will be appreciated that when the pulley 25 and drive shaft 22 are connected for rotation in unison, rotation of the drive pinion 27 will rotate the intermediate gear 28, and since this latter gear and the intermediate pinion 33 rotate together with the intermediate shaft 29, the gear 16 will be rotated to cause reciprocation of the pitman 20. Thus, a compact but highly efficient drive for the press is provided.

From the foregoing, it will be apparent to those skilled in the art that I have accomplished at least the principal object of my invention, and it also will be apparent to those skilled in the art that the embodiment herein described may be variously changed and modified, without departing from the spirit of the invention, and that the invention is capable of uses and has advantages not herein specifically described, hence it will be appreciated that the herein disclosed embodiment is illustrative only, and that my invention is not limited thereto.

I claim:

1. A power press, comprising: a crown, having spaced supports; a sleeve extending between said supports; a first gear journalled on said sleeve for rotation in the space between said supports, said first gear having an eccentric portion; a pitman reciprocable within the space between said supports, having connection with said eccentric portion; a drive shaft extending at least partially through said sleeve; and gear means driven by said drive shaft and adapted to drive said first gear.

2. A power press, comprising: a crown, having spaced supports; a sleeve extending between said supports; a first gear rotatable about said sleeve and disposed in the space between said supports, said first gear having an eccentric portion; a pitman reciprocable within the space between said supports, having connection with said eccentric portion; a drive shaft extending at least partially through said sleeve; a drive pinion carried by said drive shaft; an intermediate shaft spaced from said drive shaft; an intermediate gear carried by said intermediate drive shaft and meshing with said drive pinion; and an intermediate pinion carried by said intermediate shaft and meshing with said first gear.

3. A power press, comprising: a crown, having spaced supports; a sleeve extending between said supports; a first gear rotatable about said sleeve and disposed in the space between said supports, said first gear having an eccentric portion; a pitman reciprocable within the space between said supports, having connection with said eccentric portion; a drive shaft extending at least partially through said sleeve; a drive pinion carried by said drive shaft and disposed exteriorly of one of said supports; an intermediate shaft having a portion journalled on said one support and having an intermediate gear disposed exteriorly of said one support and meshing with said drive pinion and an intermediate pinion disposed within the space between said supports and meshing with said first gear; and a cover plate providing a bearing for another portion of said intermediate shaft.

ANTON REITBERGER.

REFERENCES CITED

The following references are of record in the file of this patent:

UNITED STATES PATENTS

| Number | Name | Date |
|---|---|---|
| 921,971 | Gass et al. | May 14, 1909 |
| 1,489,384 | Church | Apr. 8, 1924 |
| 1,781,125 | Norling | Nov. 11, 1930 |
| 1,875,600 | Hale-Shaw et al. | Sept. 6, 1932 |